United States Patent
Somerville

(10) Patent No.: US 10,060,395 B2
(45) Date of Patent: Aug. 28, 2018

(54) DEVICE AND SNORKEL AIR INTAKE COMPRISING DEVICE

(71) Applicant: Kenneth Somerville, Strathpine (AU)

(72) Inventor: Kenneth Somerville, Strathpine (AU)

( * ) Notice: Subject to any disclaimer, the term of this patent is extended or adjusted under 35 U.S.C. 154(b) by 0 days.

(21) Appl. No.: 15/069,171

(22) Filed: Mar. 14, 2016

(65) Prior Publication Data

US 2017/0130683 A1     May 11, 2017

(30) Foreign Application Priority Data

Nov. 10, 2015 (AU) ................................ 2015904627

(51) Int. Cl.
*F02M 35/10*         (2006.01)

(52) U.S. Cl.
CPC ..... *F02M 35/10013* (2013.01); *F02M 35/10321* (2013.01); *F02M 35/10327* (2013.01); *F02M 35/10354* (2013.01)

(58) Field of Classification Search
CPC ....... F02M 35/10013; F02M 35/10321; F02M 35/10327; F02M 35/10354; F02M 35/10091; F02M 35/10144
USPC .............................. 123/198 E, 184.21, 195 A
See application file for complete search history.

(56) References Cited

U.S. PATENT DOCUMENTS

| | | | | |
|---|---|---|---|---|
| 3,972,700 A * | 8/1976 | Gleockler | .......... | B01D 46/0005 55/385.3 |
| 4,157,902 A * | 6/1979 | Tokar | .................. | F02M 35/024 180/68.3 |
| 4,366,878 A * | 1/1983 | Warf | ...................... | B60K 13/02 180/68.3 |
| 6,314,931 B1 * | 11/2001 | Yasuda | ................... | F02B 61/02 123/184.53 |
| 7,237,522 B2 * | 7/2007 | Fukami | ................... | F02B 17/00 123/184.24 |
| 7,270,207 B2 * | 9/2007 | Idei | ........................ | F02B 61/02 180/219 |
| 7,314,107 B2 * | 1/2008 | Nakagome | ....... | F02M 35/10013 180/68.3 |
| 7,455,042 B2 * | 11/2008 | Jacobi-Hinderer | ........................ | F02M 35/10013 123/184.21 |
| 8,205,698 B2 * | 6/2012 | Beloy | .................... | B60K 13/02 180/68.1 |
| 8,297,276 B2 * | 10/2012 | McCarthy | ............ | B63C 11/205 128/200.29 |
| 8,960,347 B2 * | 2/2015 | Bennett | ................. | B60K 13/02 180/68.3 |
| 9,151,253 B2 * | 10/2015 | Bunnell | ............... | F02M 35/088 |
| 9,234,484 B2 * | 1/2016 | Lewington | ....... | F02M 35/10013 |
| 2008/0242213 A1 * | 10/2008 | Mayer | .................... | B60K 13/02 454/275 |
| 2010/0083928 A1 * | 4/2010 | Saito | ...................... | F02M 35/02 123/184.56 |

* cited by examiner

*Primary Examiner* — Hai Huynh
(74) *Attorney, Agent, or Firm* — DeLio, Paterson & Curcio, LLC; Thomas E. Ciesco

(57) ABSTRACT

A device for fitting to a vehicular snorkel air intake is provided. The device comprises a shield and at least one arm extending from the shield, wherein the at least one arm is adapted to position the shield in front of an inlet of the snorkel air intake.

18 Claims, 14 Drawing Sheets

DEVICE AND SNORKEL AIR INTAKE COMPRISING DEVICE

BACKGROUND OF THE INVENTION

1. Field of the Invention

The present invention relates, inter alia, to a device for fitting to a vehicular snorkel air intake, and a forward facing vehicular snorkel air intake.

2. Description of Related Art

To provide a constant air flow into the engine, regardless of speed, most car manufacturers build engines with air intakes that face forward in the car's engine bay or inner guard, as close to the grille as possible. Having the air intake in this location is convenient during travel on well maintained roads, where undesirable contaminants such as dust particles, sand and water are unlikely to enter the air intake and cause engine damage or clog the air filter.

However, engine air intakes located near the road often cause problems for drivers that take their vehicles (e.g. four wheel drives) off-road or onto less travelled roads as this tends to involve driving on dusty roads, sandy beaches, and/or through rivers and creeks. If the vehicle travels through a significant amount of water, the air inlet can be filled with water and inhibit air flow through the air filter causing the vehicle to stall. If the engine vacuum becomes high enough, water may be sucked into the engine and damage the engine. Inside the combustion chamber, when water is rapidly heated during the combustion process it turns instantly to steam resulting in a dramatic increase in combustion cylinder pressure. If excessive water is sucked in, then the water will not turn to steam. This can cause instant engine damage, particularly in diesel and turbo diesel engines as they cannot tolerate any water intake due to the high compression pressures required for a diesel to operate. Although petrol engines can tolerate small amounts of water, excess amounts of water will damage internal engine components.

Thus, to minimise dust, sand and water intake, and ensure that a supply of cleaner, dry air is available regardless of road conditions, many drivers have an external snorkel with an elevated air intake fitted to their vehicles. The snorkel is typically in the shape of a tube that contours its way from the air filter inlet, along one of the front wings and up beside the "A" pillar to the level of the roofline where it is terminated with an air intake (most air intakes are forward facing). The snorkel raises the effective height of the engine air intake up to the roof level of the vehicle.

Due to the extra height of the engine air intake, river and/or flood water is less likely to enter the engine air system. Furthermore, less dust and/or sand particles are being picked up and held in the air filter, resulting in a longer air filter life. Moreover, a cooler charge of air due to the increased distance away from the hot road surface and away from the hot engine bay, results in more energy. This cooler air charge increases the power the engine produces, therefore less throttle is required resulting in better fuel economy.

Although snorkels may mitigate some of the problems associated with a low set engine air intake in challenging driving conditions, snorkels are associated with other problems such as vast changes in air intake volume and air pressure, relative to vehicle speed.

Another problem with snorkels is their high level of rain intake during periods of rain. If the volume of water saturates the air filter, engine vacuum will draw any excess water through the filter and into the combustion chamber, resulting in detrimental outcomes ranging from poor engine performance to engine damage (diesel engines are particularly prone to damage from water ingestion).

Yet another problem with snorkels is that vehicles that are dual fuel vehicles, e.g. petrol and LPG running on liquid petroleum gas (LPG) need modifications to the air filter system to stop air ram pressure causing the engine to stall after lifting off the throttle. One of the ways to overcome issues relating to a forward facing snorkel head with a vehicle running on LPG (such as the air ramming effect) is to turn the snorkel head to the rear of the vehicle. However, the higher the vehicle speed the lower the pressure in the snorkel and air intake system, (as the fresh air is now passing the rear facing snorkel air intake), resulting in higher, less economic, fuel consumption.

It will be clearly understood that, if a prior art publication is referred to herein, this reference does not constitute an admission that the publication forms part of the common general knowledge in the art in Australia or in any other country.

SUMMARY OF INVENTION

It would be advantageous to provide vehicular snorkels with reduced air ramming effect and a more stabilised air flow into the engine during travel at different speed.

It would also be advantageous to provide vehicular snorkels with reduced water (e.g. rain) intake into their snorkel air intakes, or to provide the consumer with a useful or commercial choice.

It would also be advantageous to allow a forward facing snorkel head on a vehicle that runs on LPG without having to introduce air dump holes into the air filter housing.

It is an object of the present invention to overcome or at least minimise one or more of the problems described above, or to provide the consumer with a useful or commercial choice.

With the foregoing in mind, according to a first aspect of the present invention there is provided a device for fitting to a vehicular snorkel air intake, said device comprising a shield and at least one arm extending from the shield, wherein the at least one arm is adapted to position the shield in front of an inlet of the snorkel air intake.

According to a second aspect of the present invention, there is provided a forward facing vehicular snorkel air intake, the snorkel air intake having a shield positioned, or adapted to be positioned, in front of an inlet of the snorkel air intake.

According to a third aspect of the present invention, there is provided a kit comprising the device of the first aspect and mounting means for mounting the device to a vehicular snorkel air intake.

Preferably, the kit comprises fasteners and instructions for fastening the device to the vehicular snorkel air intake.

According to a fourth aspect of the present invention, there is provided a method of fitting a device to a vehicular snorkel air intake, said device comprising a shield and at least one arm, wherein the method comprises the step of mounting the at least one arm to a vehicular snorkel air intake such that the shield is at least partially in front of an inlet of the snorkel air intake. Optionally, the method may further comprise adjusting the shield to a position in front of an inlet of the snorkel air intake.

According to a fifth aspect of the present invention, there is provided a device for fitting to a vehicular snorkel, the device comprising a shield for positioning at least partially in front of a forward facing inlet of an air intake of the snorkel, and mounting means for mounting the device to the snorkel.

According to a sixth aspect of the present invention, there is provided an end portion of a vehicular snorkel air intake, the end portion comprising a forward facing closed end and a body portion extending from the closed end, wherein the body portion comprises one or more openings to enable air to flow through the one or more openings and into the snorkel.

Context allowing, the description below relates to features of the first to fourth aspects of the invention defined above.

The device of the invention may be fitted to a snorkel air intake, or form part of a snorkel air intake, of any type of vehicle with an engine that runs on petrol, petrol/LPG, diesel, or a vehicle with a turbo charged engine or any other internal combustion engine. Typically, the vehicle is a four wheel drive ('4WD').

The snorkel air intake, which provides a passage for air flow into the engine, may be of any suitable size, shape and construction, and may be made of any suitable material or materials. Thus, when viewed in cross-section, the geometric shape of the snorkel air intake may be round, square, rectangular, hexagonal or triangular. Non-limiting examples of materials that the snorkel air intake may be made of include metal (e.g. stainless steel) and plastics, such as polyethylene, polypropylene and polyvinyl chloride (PVC).

The snorkel air intake may be a complete snorkel or a portion of a complete snorkel, such as a snorkel head. The device may be fitted to any suitable snorkel and non-limiting examples of snorkel air intakes that may be fitted with, comprise, or be manufactured with, the device are a Safari Snorkel® (http://www.safari4x4.com.au/recreational/aus-nz/safari-snorkel), an Ironman Snorkel® (http://www.ironman4x4.com/category-products/snorkels), and a TJM Airtech Snorkel® (http://www.tjm.com.au/en-oceania/airtec-snorkels).

The device may be part of, fitted, secured or otherwise mounted to a snorkel air intake prior to installation of the snorkel air intake on the vehicle (e.g. when the snorkel is being manufactured). The device may also be fitted, secured or otherwise mounted to a previously installed snorkel air intake.

The device may be designed and/or manufactured as a separate item to the snorkel air intake. Alternatively, a snorkel air intake may incorporate the shield, combining the snorkel head and device, or complete snorkel and device, in one. Thus, the device may form part of a snorkel air intake (e.g. a snorkel head, or a complete snorkel) that suits most 4WDs, such as a Safari snorkel or a TJM Airtec snorkel, or a custom made snorkel air intake.

Preferably, snorkel air intakes combining the snorkel air intake and the shield in one are designed to be forward facing. Snorkel air intakes that combine the snorkel air intake and shield (e.g. wherein the shield is moulded into the snorkel head), typically comprise a shield that is positioned, or adapted to be positioned, in front of an inlet of the snorkel air intake by any suitable means, such as a mesh, or one or more arms.

Suitably, the device will be mounted on the air inlet side of the existing snorkel, across the open face at an angle that provides a sufficient reduction from the air ramming effect at speed. Typically, the shield will be substantially vertical but may be adjusted depending, for example, on the design of the snorkel air intake and/or driving conditions.

In one embodiment, the shield/front face may be pivotally mounted to the snorkel air intake so as to allow the shield/front face to pivot between a clear position and an in-use position when the device is mounted to the snorkel air intake. A person of skill in the art will appreciate that in the "clear" position, the shield/front face is clear of the air inlet, either up or down, and that in the "in use" position, the shield/front face is in front of the air inlet.

The shield/front face may be pivotally mounted to the snorkel air intake by way of a screw fastener or a pin. The shield/front face may be held in the desired (clear or in-use) position by way of any suitable means located on at least a portion of the at least one arm or on the snorkel air intake. In one embodiment, suitable stop means or travel stops may be used to limit the travel of the shield/front face between the in-use position and the clear position.

Typically, the device will be mounted to a snorkel head, but the device may also be mounted to a main snorkel body (either before or after installation of the snorkel).

In some embodiments, the shield may form a face of a body, the body having an attachment opening for fitting over the snorkel to facilitate attachment of the body to the snorkel, the body including one or more openings to enable air to flow through the one or more openings and into the air intake of the snorkel. The body may be a hollow body.

In one embodiment, the snorkel may comprise a forward facing air intake, and a shield positioned in front of and forwardly of the air intake. The shield may be integrally formed with the snorkel. The shield may be spaced from the air intake by one or more arms or by a body portion, the body portion having one or more openings to enable air to flow through the one or more openings and into the air intake of the snorkel.

The device may be of any suitable size, shape and construction and may be made of any suitable material or materials. The device may, for example, be made from any material suitable for outdoor use including a variety of metals (e.g. steel or metal alloy), various plastics including polyethylene, polypropylene, polycarbonate or polyurethane, fiberglass and carbon fibre.

Suitably, the device is made from stainless steel, e.g. 304 stainless steel.

The device may be of unitary construction or may comprise two or more attachable pieces (e.g. a shield portion and at least one arm portion). The separate pieces may be made of the same material (e.g. stainless steel) or of different materials. Thus, the shield may be made of metal, e.g. stainless steel, while the at least one arm, or a portion thereof, may be made of a different material, such as plastics.

The device may comprise, for example, a shield in the form of a plate with a front deflector face and at least one rearward facing mounting arm that mounts the device to the snorkel air intake, e.g. an existing snorkel on a vehicle. Typically, the at least one arm has one or more openings for receiving one or more fasteners (e.g. screws, rivets or bolts) so as to allow the device to be fastened, secured or otherwise attached to the snorkel air intake. The device may also be secured to the snorkel by way of clips. The number of fasteners (e.g. screws, rivets, bolts or clips) required to fasten the device to a snorkel air intake will vary but should be sufficient to fasten the device securely to the snorkel head or snorkel body and prevent the device from dislodging during vehicle operation.

Provided that the benefits of the device are achieved (e.g. reduced air ramming effect/less air pressure variation, and/or reduced rain intake resulting in, e.g., a lower risk of a saturated air filter and engine damage), the dimensions of the device may vary, and may depend on the dimensions of the snorkel air intake with which the device is being used, or forming part of.

Typically, the dimensions (width and height) of the shield are similar to the dimensions of a snorkel air inlet with which the device is being used. Preferably, the shield of the device is about 100 mm to about 300 mm wide, more preferably about 120 mm to about 200 mm wide, and even more preferably about 145 mm to about 165 mm wide. Preferably the shield of the device is about 80 mm to about 140 mm high, more preferably about 90 mm to about 120 mm high, and even more preferably about 100 mm to about 115 mm high.

Preferably, the at least one arm of the device is about 100 mm to about 200 mm long, more preferably about 120 mm to about 180 mm long, and even more preferably about 140 mm to about 160 mm long.

In a particular embodiment, the shield is about 155 mm wide and about 110 mm high, while the at least one arm is about 150 mm long.

The overall shape of the shield, front face, or deflector portion can take most forms. Thus, the shield may be of circular, oval, rectangular, square, pentagonal, hexagonal or triangular shape. The shield, front face or deflector may, for example, be a square or rectangular metal (e.g. stainless steel) plate. In some embodiments, the shield is a bent metal plate.

The overall shape of the at least one arm can take most forms. Thus, the at least one arm may, for example, be of a generally rectangular, square or oval shape.

The at least one arm may be of unitary construction and attached to the shield/front face by any suitable means, or formed as a unitary piece with the shield/front face. The at least one arm may comprise one or more attachable pieces. In one embodiment, the or each at least one arm may comprise a first arm portion or a base mounted to the snorkel air intake (e.g. by way of screw fasteners), and a second arm portion attached/connected to, or formed as a unitary piece with, the shield/front face of the device. In one particular embodiment, the second arm portion is formed as a unitary piece with the shield/front face and pivotally mounted to the first arm portion or base and/or the snorkel air intake so as to allow the shield/front face of the device to pivot, rotate or otherwise move between a clear position to an in-use position. The first arm portion may comprise one or more travel stops that maintain the shield/front face in the desired (clear or in-use) position. Those skilled in the art will understand that any appropriate travel stop structure may be used. For example, the travel stop may be a welded protrusion, a rivet, and the like, as long as the travel stop includes some structure which prevents further movement of the shield/front face away from the desired position.

Preferably, when the device is secured to the snorkel air intake. (e.g. by one or more fasteners, such as screws, clips, bolts or rivets), and in use, there is a clearance, space or distance between the shield and the snorkel air inlet of the snorkel air intake.

The distance between the shield and the snorkel air inlet may be adjusted by using one or more openings (e.g. screw holes) provided along the arm. Typically, the at least one aria has 1, 2, 3, 4, 5, 6 and up to about 10 openings to choose from, allowing a large range of distances between the shield and the snorkel air inlet. The at least one arm may also be fitted with a handle that extends rearwardly from the arm to allow a driver to adjust the position of the device (e.g. the distance between the shield and the air inlet, or from a clear to an in-use position and vice versa) to suit driving conditions.

Preferably, the shield of the device is positioned about 5 mm to about 700 mm in front of the snorkel air inlet, more preferably about 20 mm to about 600 mm wide, and even more preferably about 30 mm to about 300 mm in front the snorkel air inlet.

In one embodiment, the device comprises a substantially vertical shield/front face and a pair of arms extending rearwardly from the front face for securing the device to the snorkel air intake by bolts, clips, rivets or screws. In this embodiment, the device is of a generally square or rectangular shape when viewed from above.

In another embodiment, the device comprises a shield/front face comprising a flange that extends rearwardly from an upper edge of the front face, and a pair of arms extending rearwardly from the front face for securing the device to the snorkel air intake by bolts, clips, rivets or screws.

In some embodiments, the device comprises a first face extending at an angle, and a second face extending at an angle, wherein the first and second faces join along a front end part of the device. In these embodiments, the device is generally V-shaped when viewed from above.

In other embodiments, the device has a generally U-shaped leading edge and is generally U-shaped when viewed from above.

In another embodiment, the device comprises a shield/front face that extends at an angle to horizontal and a pair of arms extending rearwardly from the front face for securing the device to the snorkel air intake by bolts, clips, rivets or screws.

In some embodiments, the device may comprise one or more extensions that extend outwardly and/or rearwardly from the shield and/or arms, in the same directions as the at least one arm. Typically, the extensions are provided as decorations (i.e. for aesthetic purposes) and may or may not serve a functional purpose.

From the foregoing, it will be appreciated that the main feature of the device is the shield/front face/deflector. When the device is fitted to the snorkel air intake and in use, there is a clearance, space or void between the shield/front face/deflector of the device and the air inlet of the snorkel air intake. One aim of the shield/front face/deflector design is to provide a buffering effect to any air that would enter the air intake of the snorkel (i.e. reduce the air ramming effect experienced by the snorkel while driving at different speed). The buffering effect will limit changes in pressure due to changes in vehicle speed. Suitably, the device will provide a more stable air flow to the engine without choking or restricting the engine's air supply. Another aim of the shield is to act as a barrier and deflect rain away from the snorkel air intake (e g. limit, or at least partly reduce water damage, water contamination and or saturation of the air filter and internal engine components and prevent stalling on LPG).

Also, any of the features described herein can be combined in any combination with any one or more of the other features described herein within the scope of the invention.

BRIEF DESCRIPTION OF DRAWINGS

Various embodiments of the invention will be described with reference to the following drawings, in which.

Preferred features, embodiments and variations of the invention may be discerned from the following Description which provides sufficient information for those skilled in the art to perform the invention. The Description is not to be regarded as limiting the scope of the preceding Summary of the Invention in any way.

DESCRIPTION OF THE PREFERRED EMBODIMENT(S)

Figure 1:
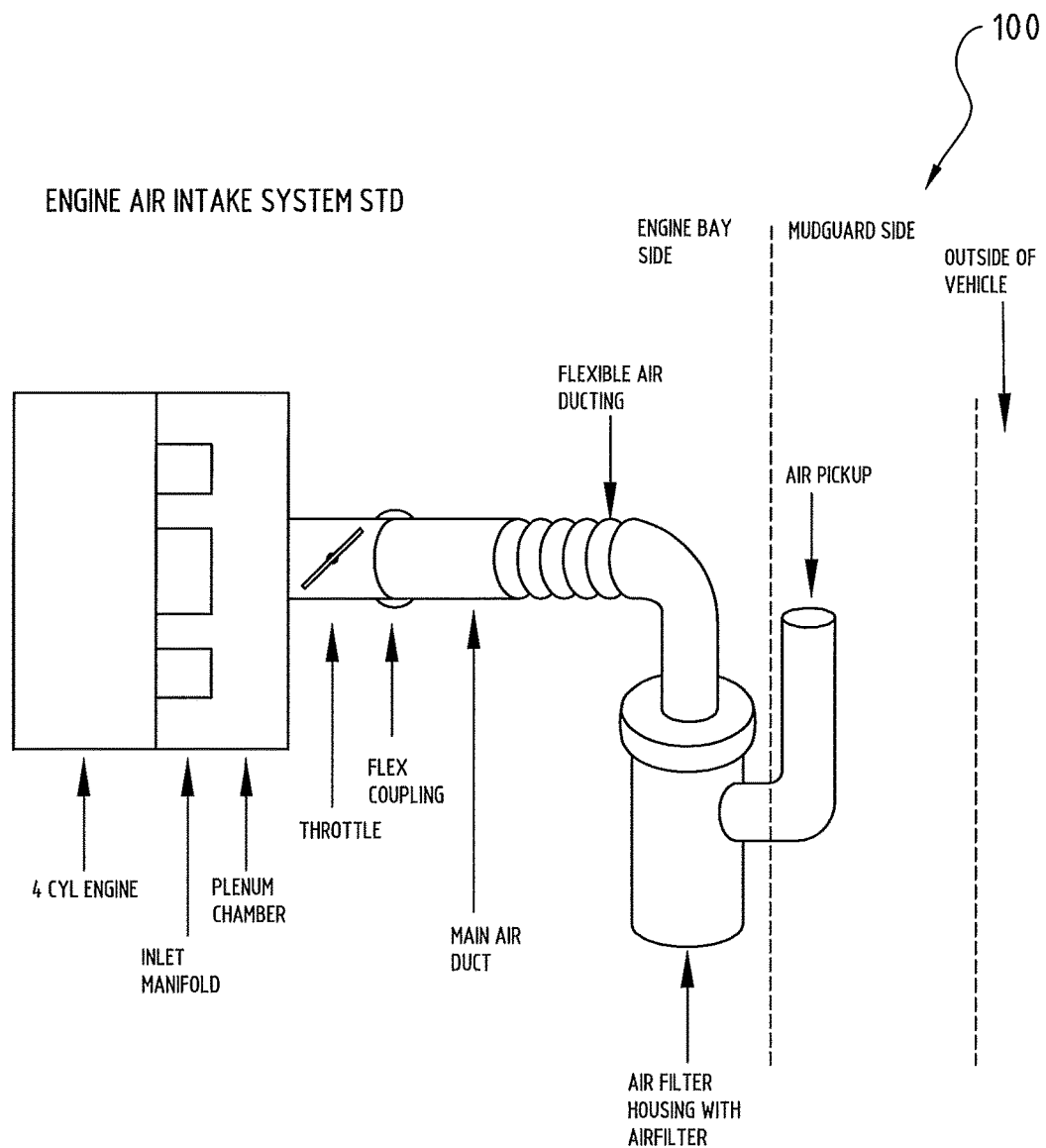
FIG. 1 shows a general schematic automotive manufacturer design with an air intake in the mudguard void of a diesel or petrol engine (prior art).

Referring first to FIG. 1 (prior art), there is shown a general manufacture design (100) of an engine (petrol or diesel) where the air pick up is in the mudguard void of the vehicle.

Figure 2:
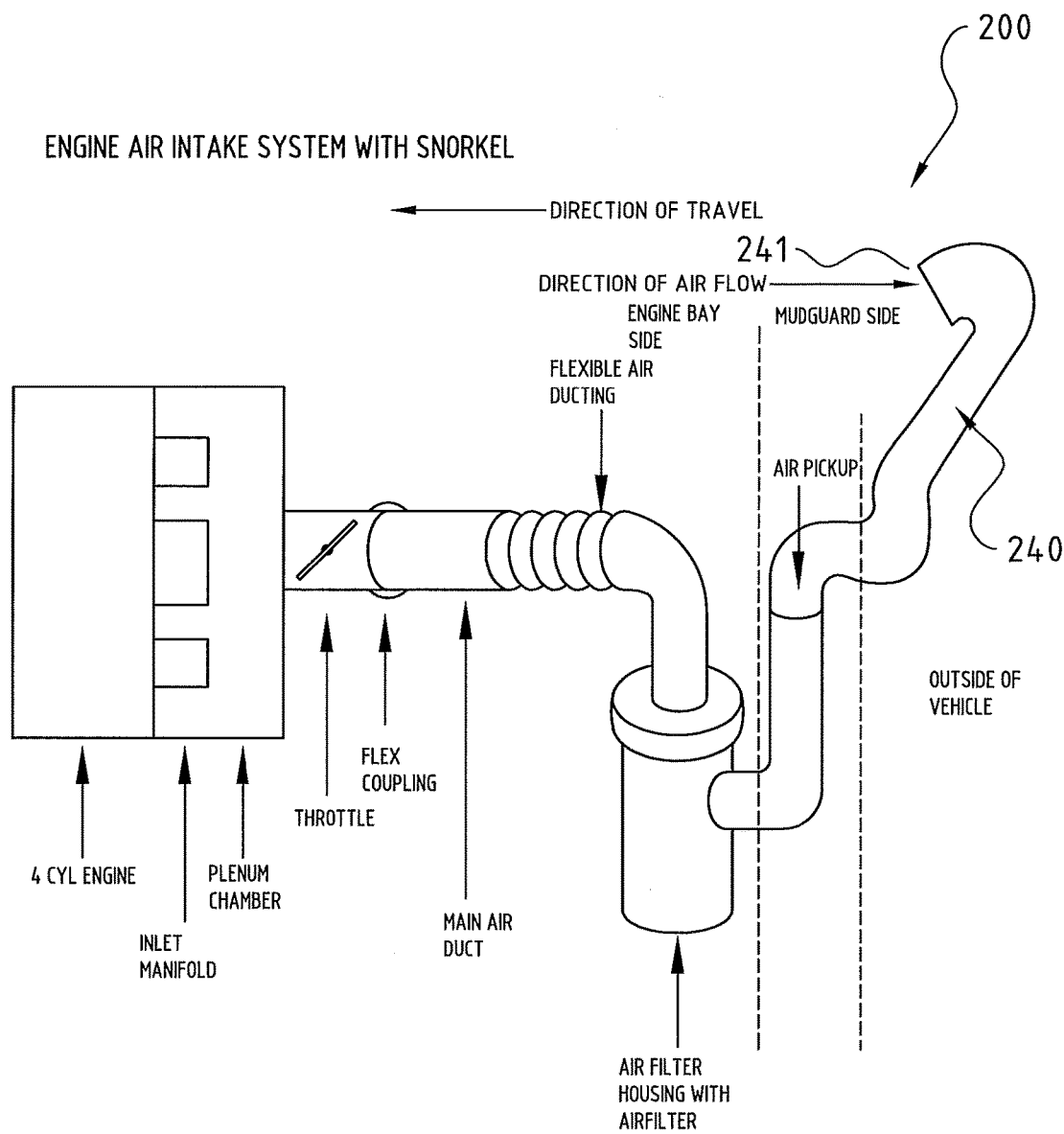
FIG. 2 shows a snorkel air intake of a diesel or petrol engine (prior art).

Referring to FIG. 2 (prior art), there is shown a manufacture design (200) of a diesel or petrol engine where the air pick up is through a snorkel air intake (240). In FIG. 2, the air inlet (241) of the snorkel is forward facing, in that the air inlet (241) faces the direction of travel of the vehicle.

Referring to FIGS. 3(a) and 4(a) to 13(b), there is shown various devices (10, 20, 30, 40, 50, 60, 70, 80, 90) that are each securable to a snorkel air intake. Each device (10, 20, 30, 40, 50, 60, 70, 80, 90) is designed to provide a clearance, space or void between the shield/front face/deflector of the device and the air inlet of the snorkel air intake. The devices are designed to (i) reduce the air ramming effect while driving at different speed; (ii) and reduce water/rain intake.

Figure 3A:
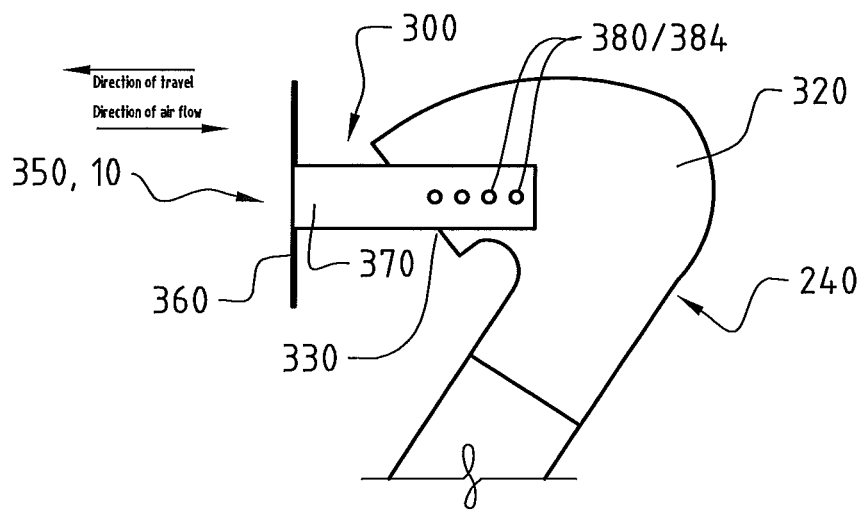
FIG. 3(a) shows a side view of a general orientation of a device on a snorkel head according to an embodiment of the invention.
Figure 3B:
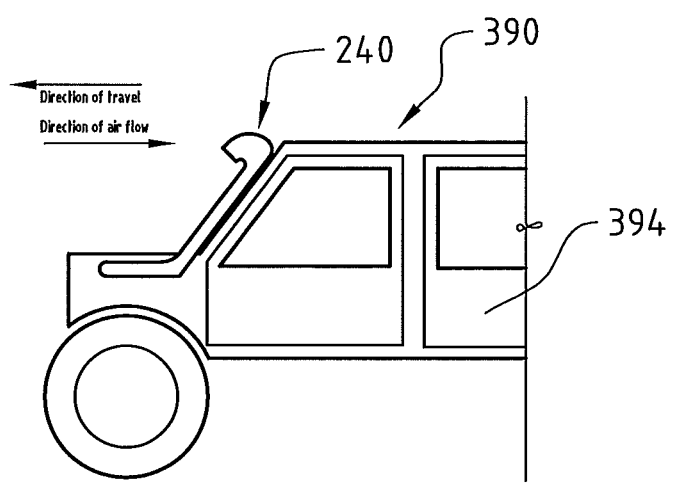
FIG. 3(b) shows a general orientation of a snorkel on a motor vehicle (prior art).

Referring now to FIG. 3(a), there is shown a device (350, 10) fitted to a snorkel head (320). The shield (360) is in the form of a substantially vertical front face that is positioned in front of an inlet (330) of a forward facing vehicular snorkel air intake (240). Also shown is one of the two arms (370), which extends rearwardly from the front face and comprises four openings (380) for receiving screw fasteners (not shown). The arm is adapted to secure the device (350, 10) to the side of the snorkel head (320) by way of screw fasteners (not shown). In use, after the device (350, 10) has been secured to the snorkel head (320), there is a clearance, space or void between the shield/front face (360) of the device (350, 10) and the inlet (330) of the snorkel air intake (240). Referring to FIG. 3(b) (prior art), there is shown the general position of a forward facing snorkel (240), to which the device of the invention (350) may be fitted, on a vehicle (394).

Figure 4A:
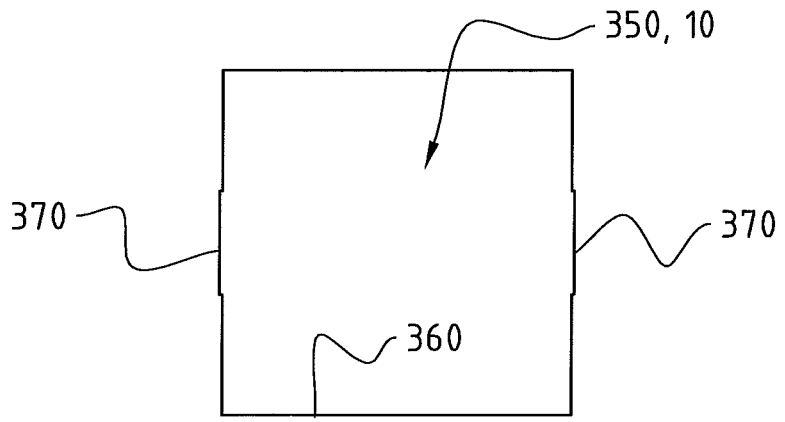
FIG. 4(a) shows a top view of the device shown in FIG. 3(a).
Figure 4B:
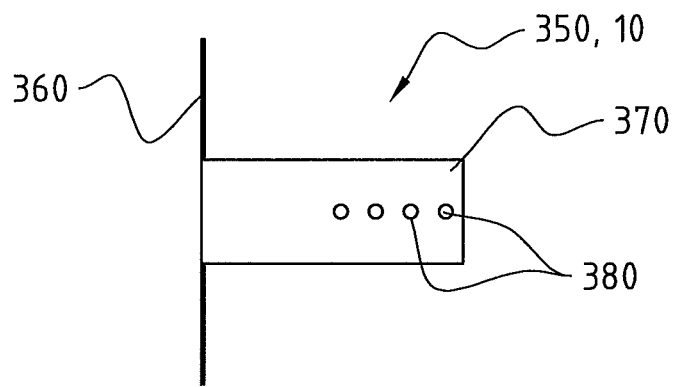
FIG. 4(b) shows a left side view of the device shown in FIG. 3(a)
Figure 4C:
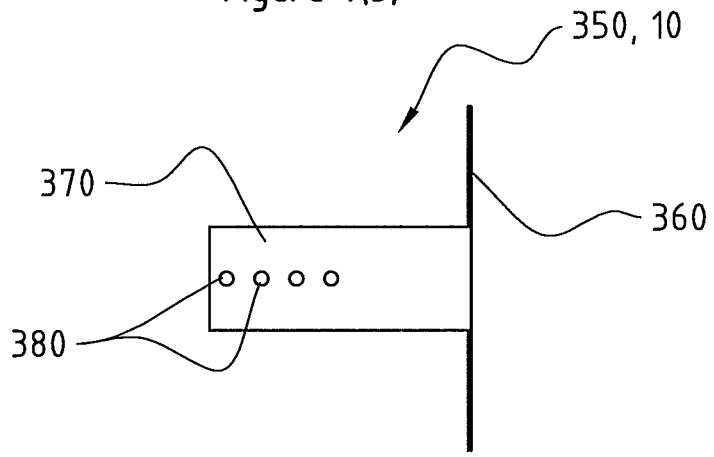
FIG. 4(c) shows a right side view of the device shown in FIG. 3(a).

Referring now to FIG. 4(a), there is shown a top view of the device (350, 10) shown in FIG. 3(a) comprising a shield (360) in the form of a substantially vertical front face, and two rearward facing arms (370) for securing the device (350, 10) to a vehicular snorkel air intake (not shown). Referring to FIGS. 4(b) and 4(c), there is shown left and right side views of the device (350, 10) shown in FIG. 3(a). The arms (370) of the device comprise four openings or holes (380) for receiving screw fasteners (not shown) for securing the device (350, 10) to a snorkel air intake (e.g. a snorkel head) (not shown).

Figure 5:
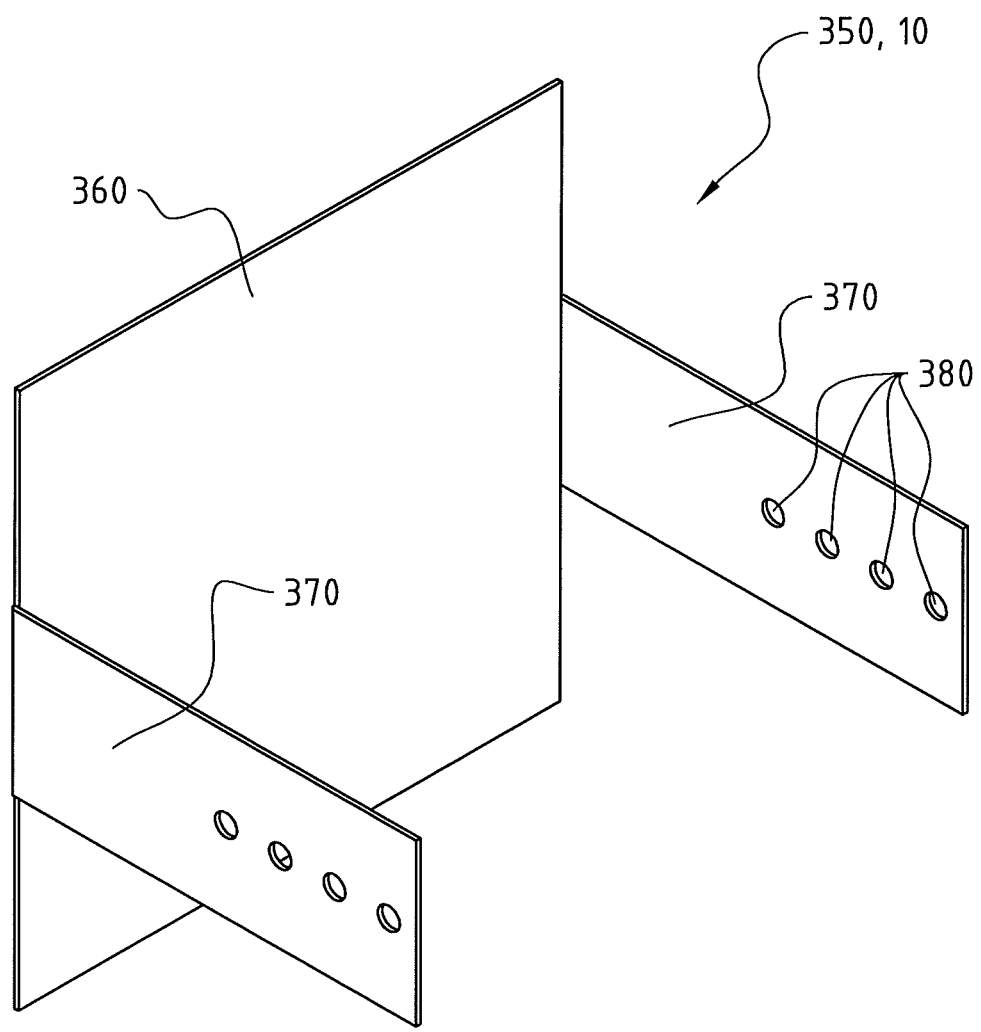
FIG. 5 shows a perspective view of the device shown in FIG. 3(a).

Referring now to FIG. 5, there is shown a perspective view of the device (350, 10) shown in FIG. 3(a). Two arms (370) extend rearwardly from the shield (360) so as to position the shield (360) in front of a snorkel air inlet (not shown). Each arm (370) has four openings or holes (380) for receiving screw fasteners (not shown) for securing the device (350, 10) to the snorkel air intake (not shown).

Figure 6A:
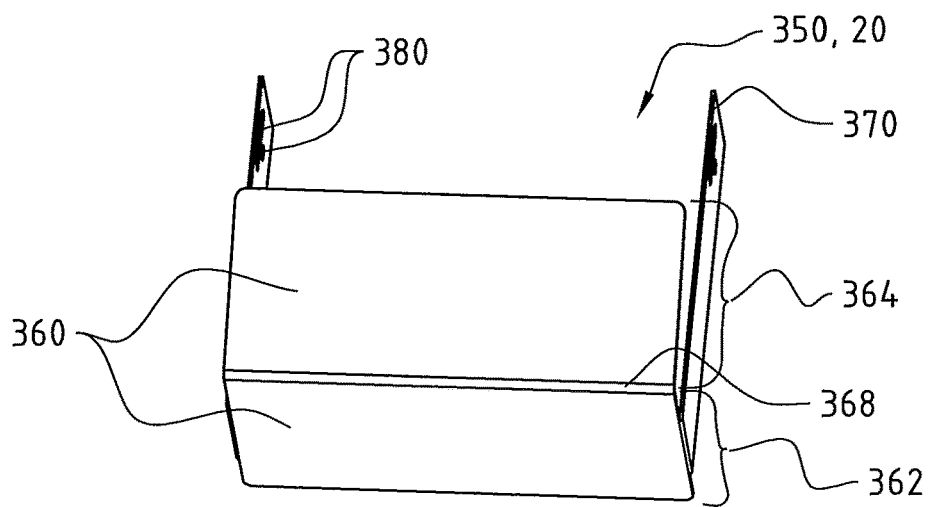
FIG. 6(a) shows a top perspective view of a device according to another embodiment of the invention.
Figure 6B:
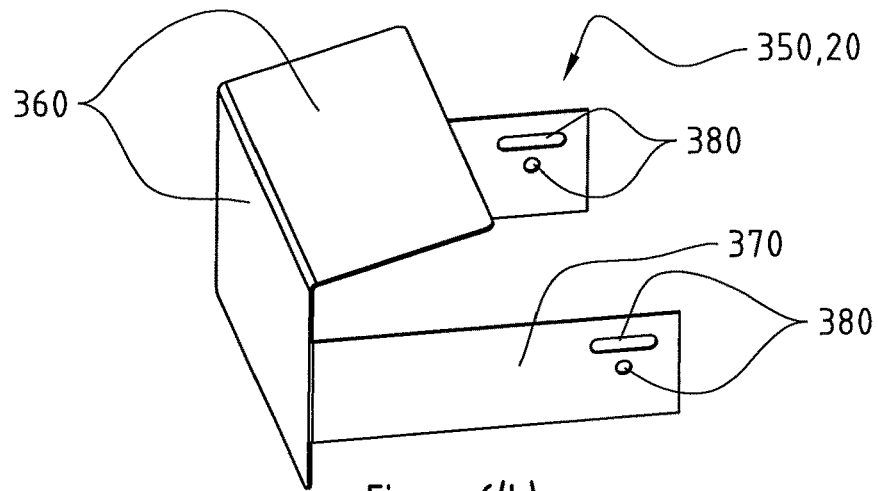
FIG. 6(b) shows a side perspective view of the device shown in FIG. 6(a)
Figure 6C:
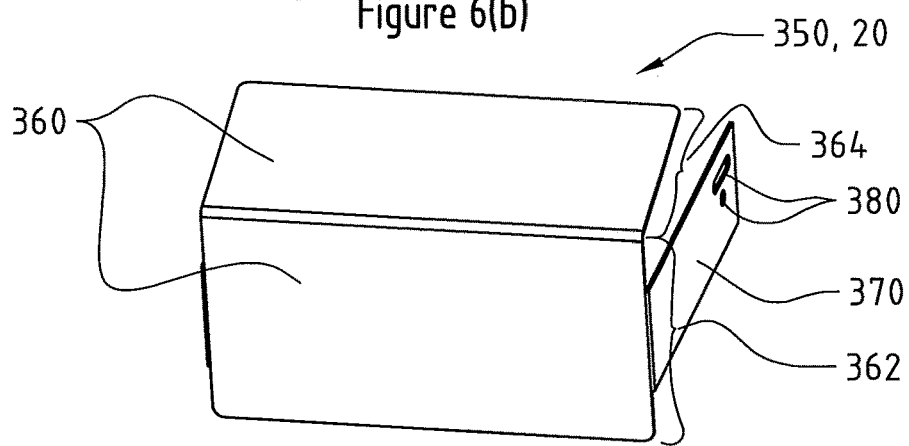
FIG. 6(c) shows a front perspective view of the device shown in FIG. 6(a).

Referring now to FIGS. 6(a) to 6(c), there is shown a device (350, 20) for fitting to a snorkel air intake (not shown) comprising a shield (360) with a front face (362) having a flange (364) extending rearwardly from an upper edge (368) of the front face (362). Two arms (370) extend rearwardly from the shield (360) so as to position the shield (360) in front of a snorkel air inlet (not shown). Each arm (370) has two openings (380) for receiving screw fasteners (not shown) which secure the device (350, 20) to the snorkel head (not shown). In use, after the device (350, 20) has been secured to the snorkel head, there is a clearance, space or void between the shield (360) of the device (350, 20) and the inlet of the snorkel air intake.

Figure 7A:
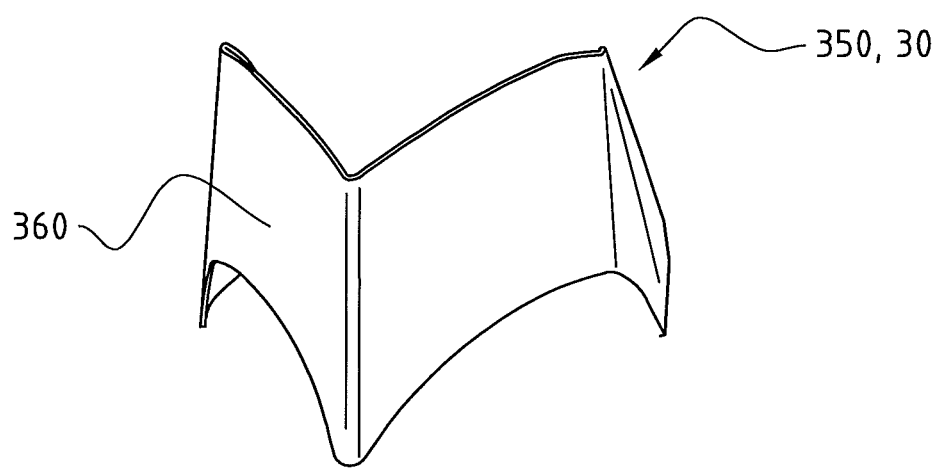
FIG. 7(a) shows a front perspective view of a device according to another embodiment of the invention.
Figure 7B:
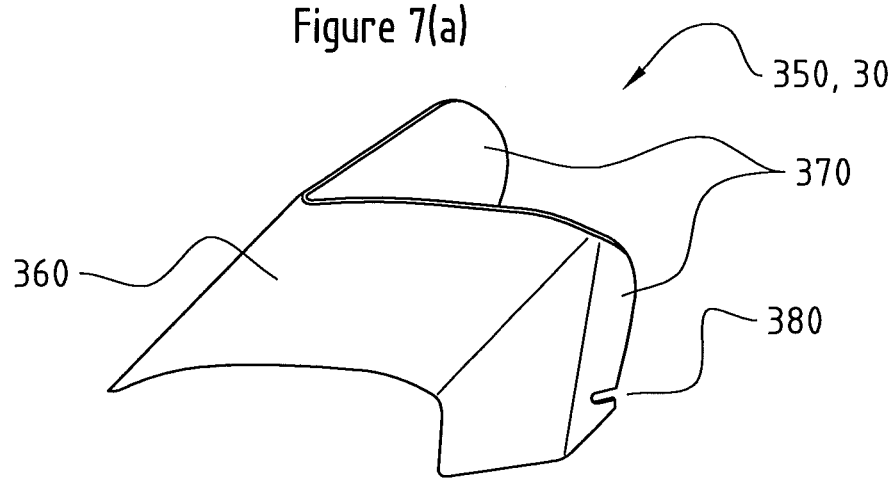
FIG. 7(b) shows a side perspective view of the device shown in FIG. 7(a)
Figure 7C:
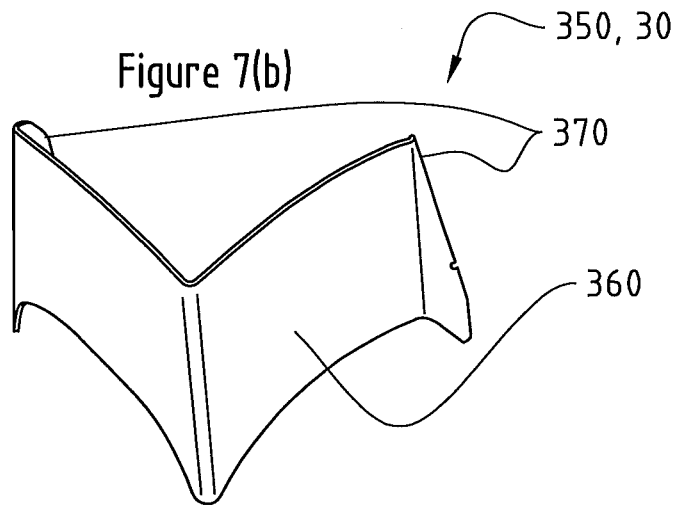
FIG. 7(c) shows a different front perspective view of the device shown in FIG. 7(a).

Referring now to FIGS. 7(a) to 7(c), there is shown a device (350, 30) for fitting to a snorkel air intake comprising a first face extending at an angle, and a second face extending at an angle, wherein the first and second faces join along a front end part. When viewed from above, the device (350, 30) is generally V-shaped.

Figure 8A:
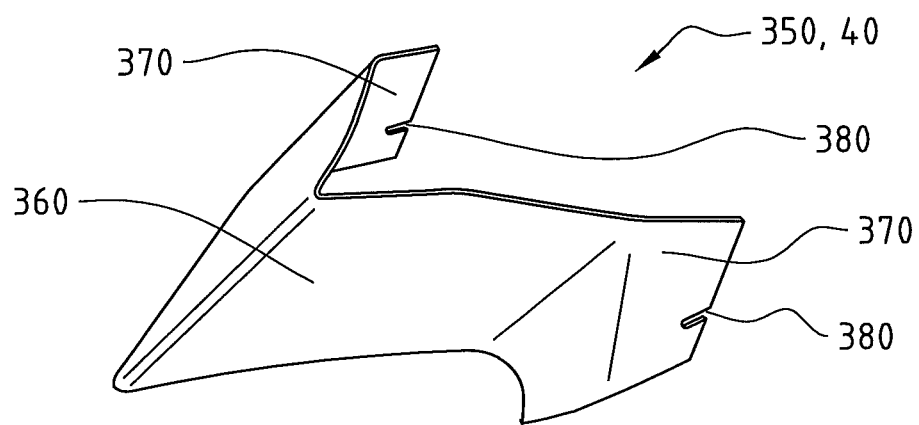
FIG. 8(a) shows a side perspective view of a device according to another embodiment of the invention.
Figure 8B:
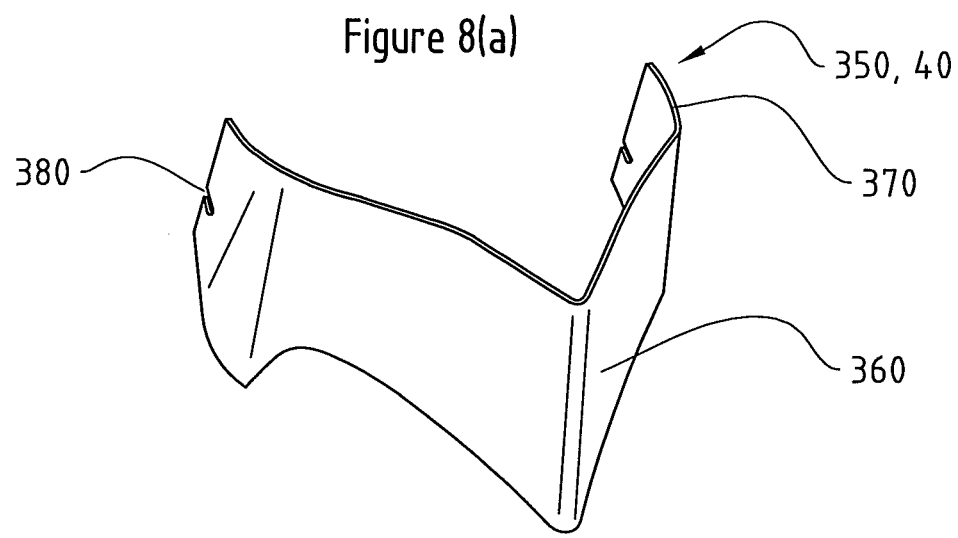
FIG. 8(b) shows a front perspective view of the device shown in FIG. 8(a)
Figure 8C:
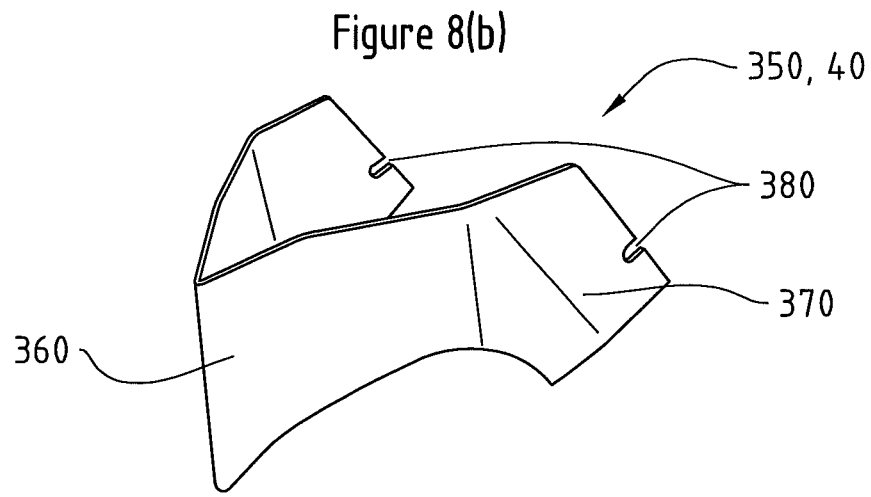
FIG. 8(c) shows a different side perspective view of the device shown in FIG. 8(a).

Referring now to FIGS. 8(a) to 8(c), there is shown a device (350, 40) for fitting to a snorkel air intake comprising a first face extending at an angle, and a second face extending at an angle, wherein the first and second faces join along a front end part. When viewed from above, the device (350, 40) is generally V-shaped.

Figure 9A:
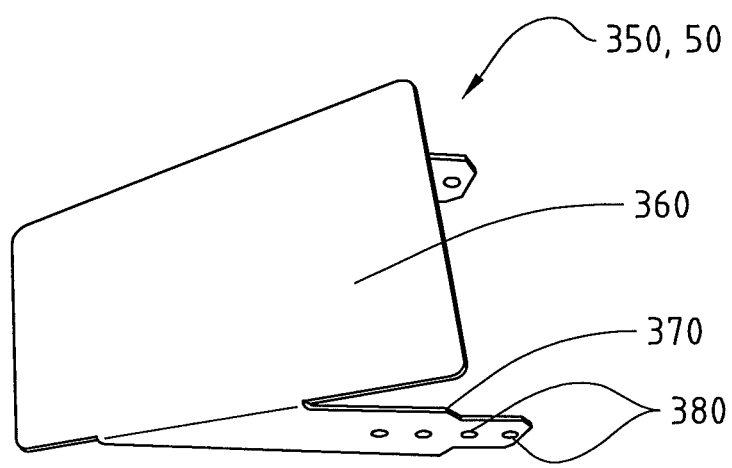
FIG. 9(a) shows a top perspective view of a device according to another embodiment of the invention.
Figure 9B:
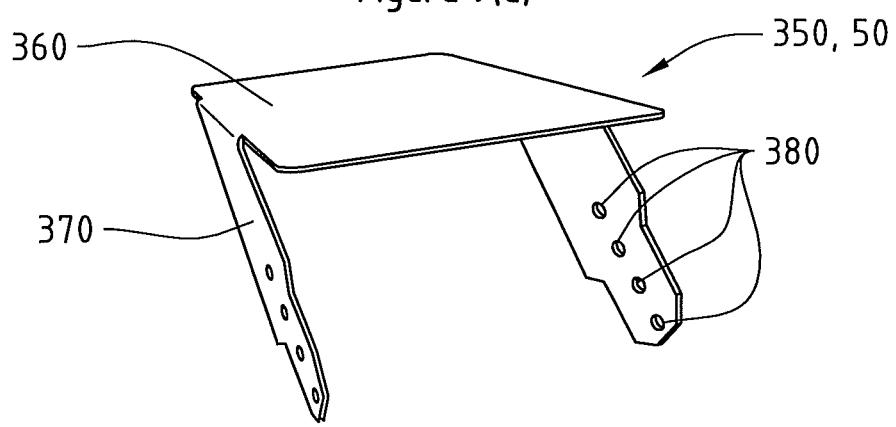
FIG. 9(b) shows a rear perspective view of the device shown in FIG. 9(a)
Figure 9C:
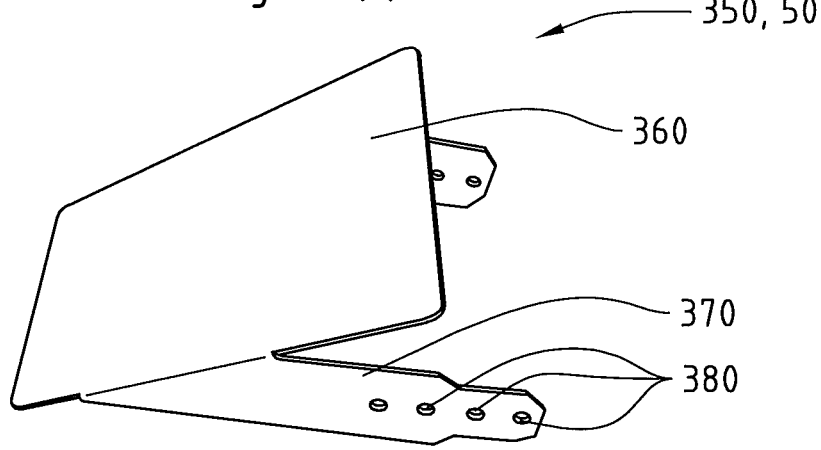
FIG. 9(c) shows a side perspective view of the device shown in FIG. 9(a).

Referring now to FIGS. 9(a) to 9(c), there is shown a device (350, 50) for fitting to a snorkel air intake comprising a shield/front face (360) extending at an angle to horizontal. Two arms (370) extend rearwardly from the shield/front face (360). Each arm (370) has four openings (380) for receiving screw fasteners (not shown) which secure the device (350, 50) to the snorkel head (not shown). In use, after the device (350, 50) has been secured to the snorkel head, there is a clearance, space or void between, at least, the front end part of the shield (360) of the device (350, 50) and the inlet of the snorkel air intake.

Figure 10A:
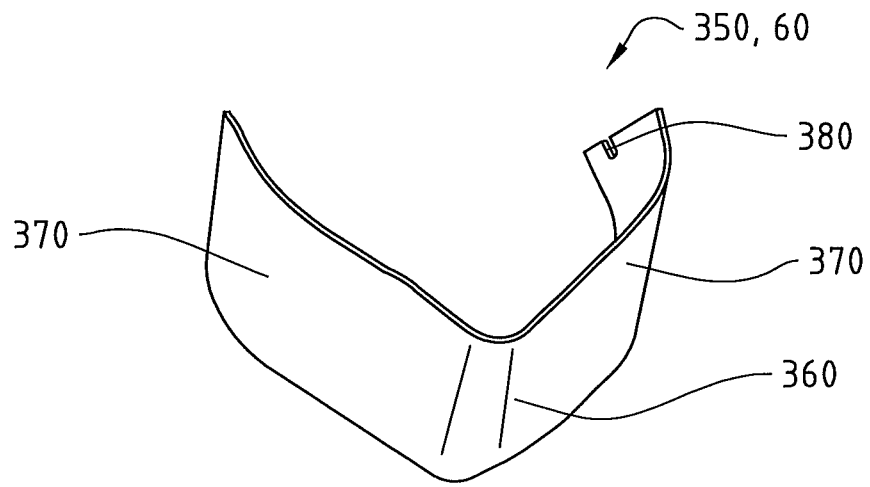
FIG. 10(a) shows a top perspective view of a device according to another embodiment of the invention.
Figure 10B:
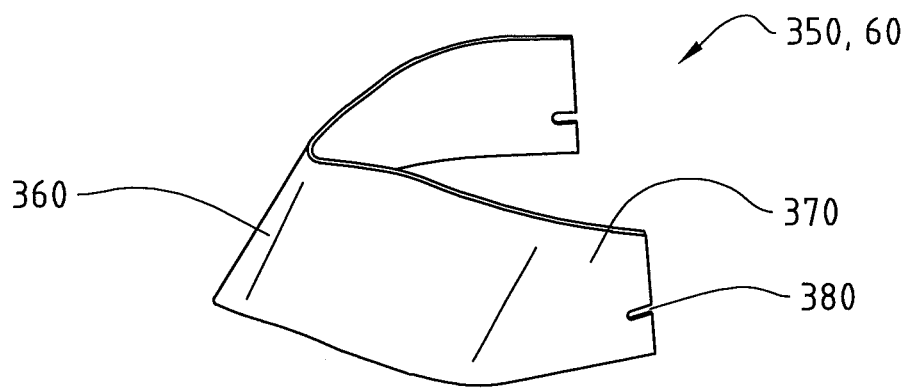
FIG. 10(b) shows a side perspective view of the device shown in FIG. 10(a)
Figure 10C:
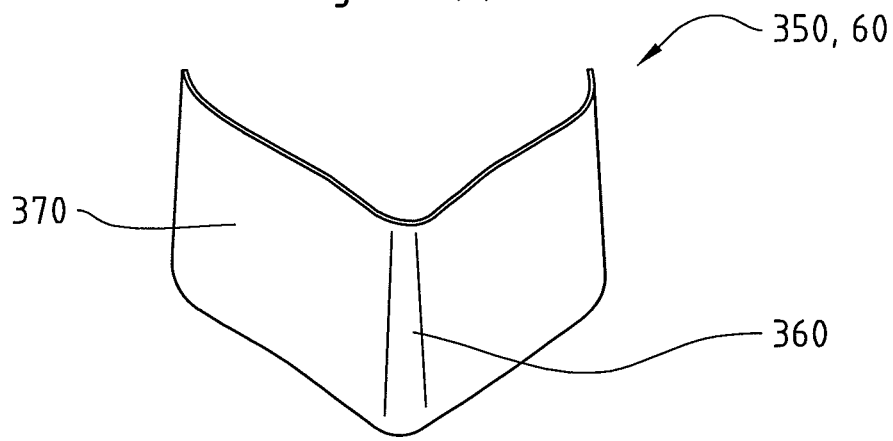
FIG. 10(c) shows a front perspective view of the device shown in FIG. 10(a).

Referring now to FIGS. 10(a) to 10(c), there is shown a device (350, 60) for fitting to a snorkel air intake having a generally U-shaped leading edge. Two arms (370) extend rearwardly from the shield/front face (360). Each arm (370) has an opening (380) for receiving a fastener (not shown) that secure the device (350, 60) to the snorkel head (not shown). In use, after the device (350, 60) has been secured to the snorkel head, there is a clearance, space or void between, at least, the shield (360) of the device (350, 60) and the inlet of the snorkel air intake.

Figure 11:
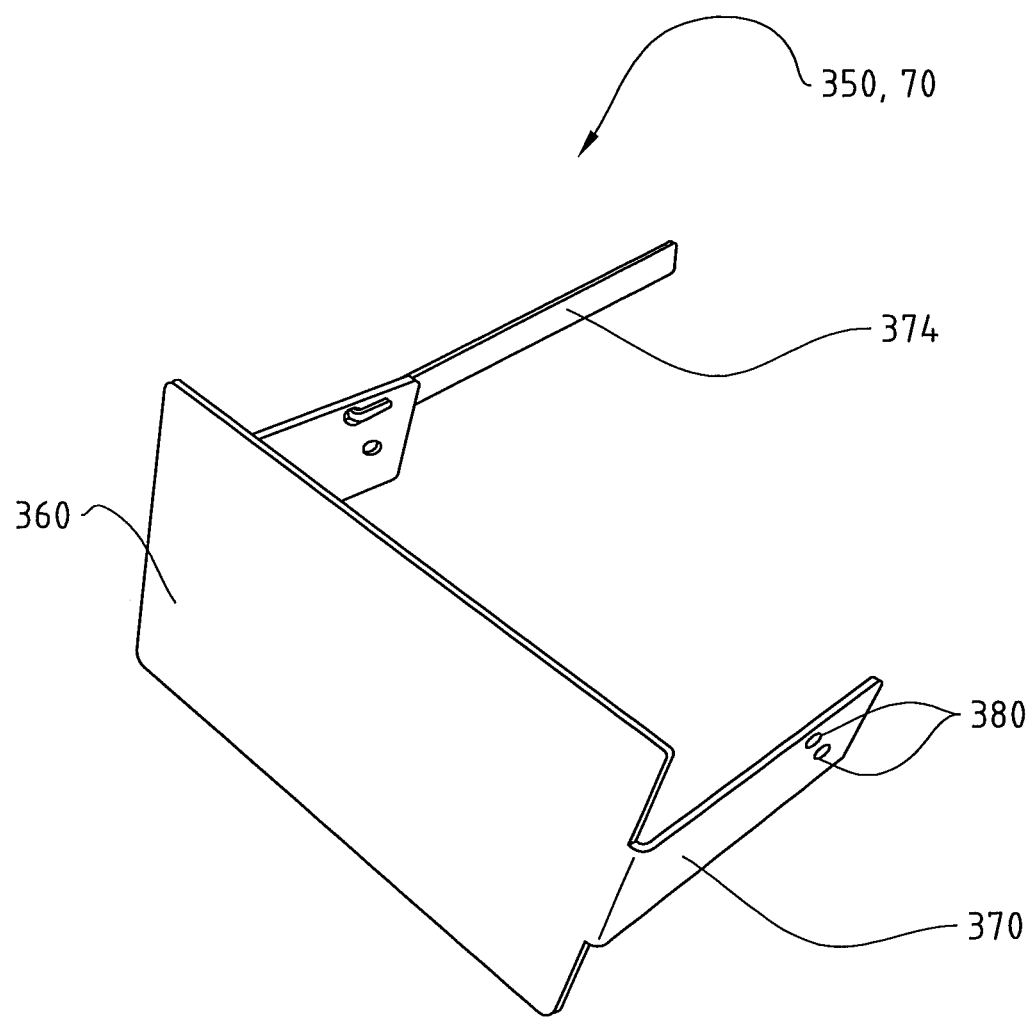
FIG. 11 shows a top perspective view of a device according to another embodiment of the invention.

Referring now to FIG. 11, there is shown a device (350, 70) for fitting to a snorkel air intake having a substantially vertical shield/front face (360). Two arms (370) extend rearwardly from the shield/front face (360). Each arm (370) has two openings (380) for securing the device (350, 70) to the snorkel head (not shown). The device (350, 70) has a handle (374) extending rearwardly from one of the arms (370). In use, after the device (350, 70) has been secured to the snorkel head, there is a clearance, space or void between the shield (360) of the device (350, 70) and the inlet of the snorkel air intake.

Figure 12A:
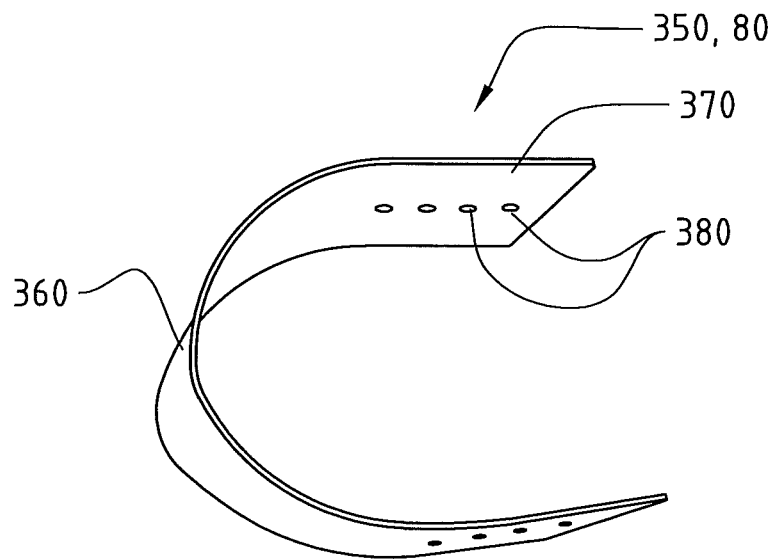
FIG. 12(a) shows a top perspective view of a device according to another embodiment of the invention.
Figure 12B:
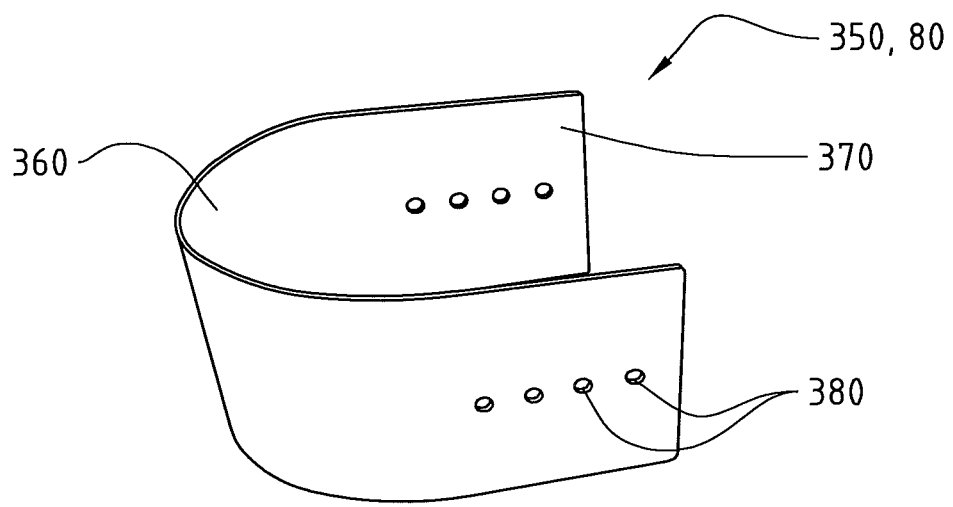
FIG. 12(b) shows a side perspective view of the device shown in FIG. 12(a).

Referring now to FIGS. 12(a) and 12(b), there is shown a device (350, 80) having a generally U-shaped construction when viewed from above. Two arms (370) extend rearwardly from the shield/front face (360). Each arm (370) has four openings (380) for securing the device (350, 80) to the snorkel head (not shown). In use, after the device (350, 80) has been secured to the snorkel head, there is a clearance, space or void between the shield (360) of the device (350, 80) and the inlet of the snorkel air intake.

Figure 13A:
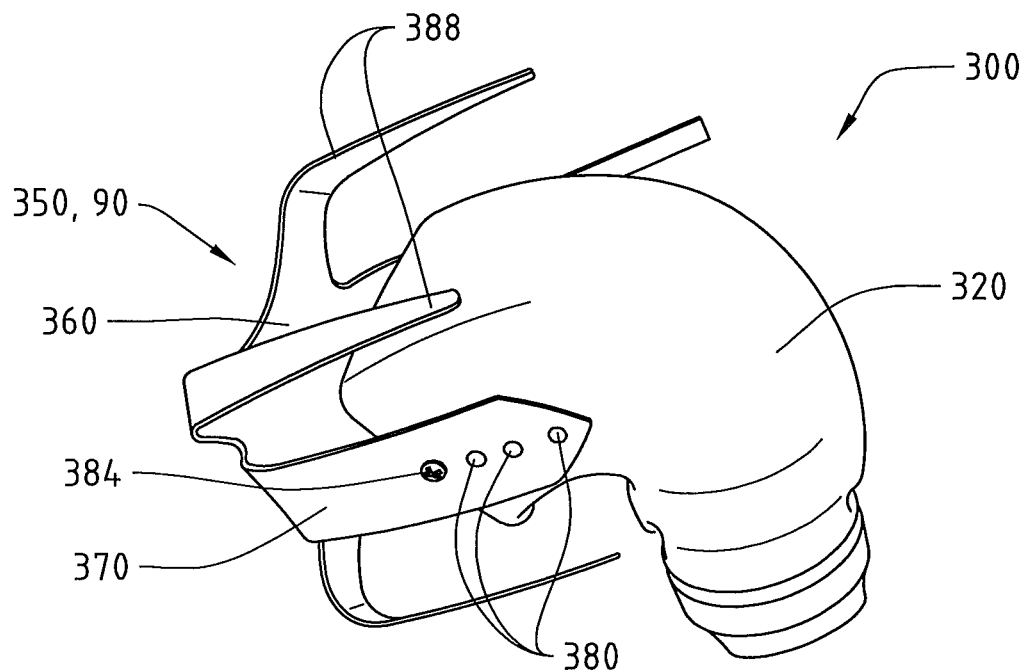
FIG. 13(a) shows a side perspective view of a device according to another embodiment of the invention fitted to a snorkel head.
Figure 13B:
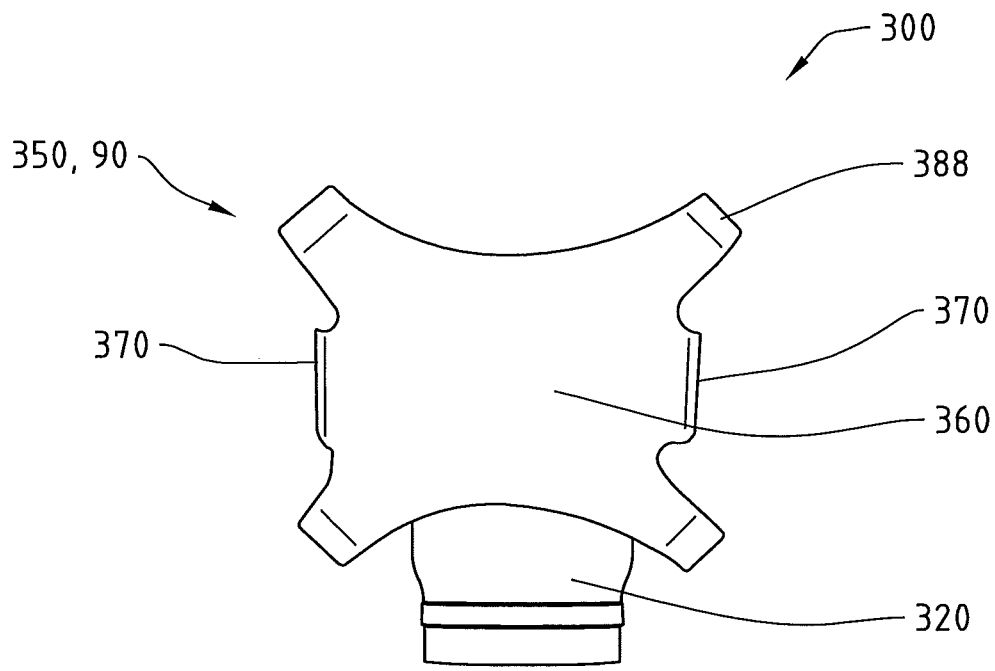
FIG. 13(b) shows a front perspective view of the device shown in FIG. 13(a) fitted to a snorkel head.

Referring now to FIG. 13, there is shown a device (350, 90) fitted to a snorkel head (320, 300). Two arms (370) extend rearwardly from the shield/front face (360). Each arm (370) has four openings (380) for securing the device (350, 90) to the snorkel head (320) by way of screw fasteners (384). The device (350, 90) also includes one or more extensions (388) extending rearwardly from the front face (360). The one or more extensions (388) may be for decorative/aesthetic purposes. In use, after the device (350, 90) has been secured to the snorkel head, there is a clearance, space or void between the shield (360) of the device (350, 90) and the inlet of the snorkel air intake.

Figure 14A:
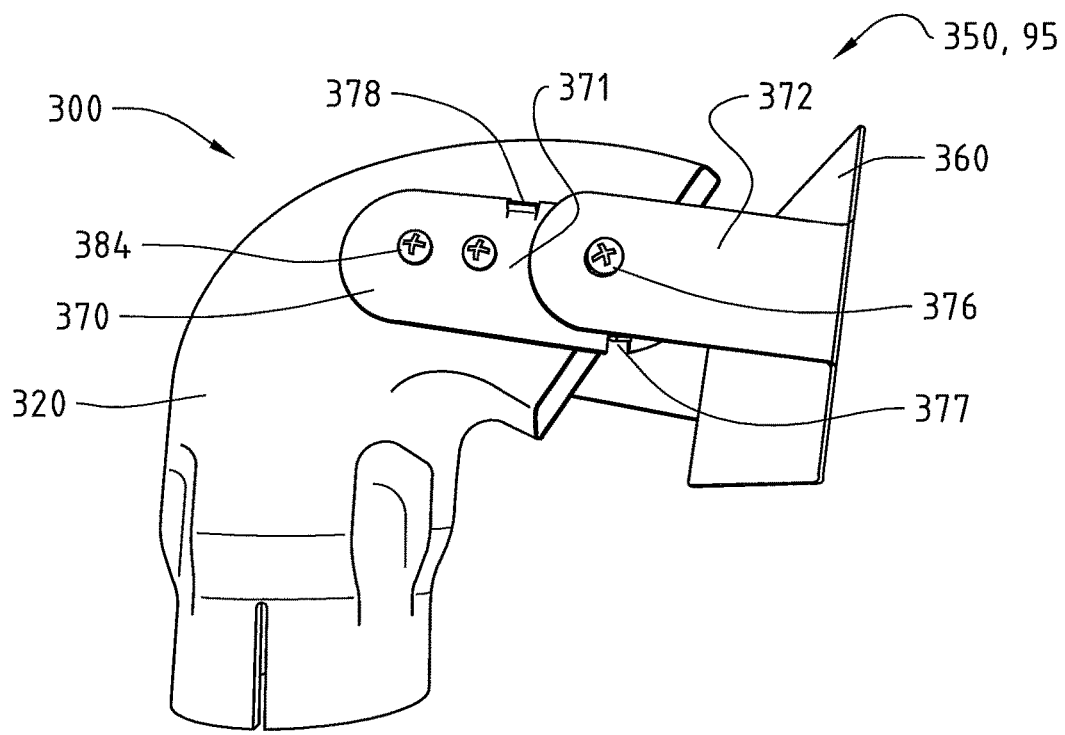
FIG. 14(a) shows a side perspective view of a device according to another embodiment of the invention fitted to a snorkel head.
Figure 14B:
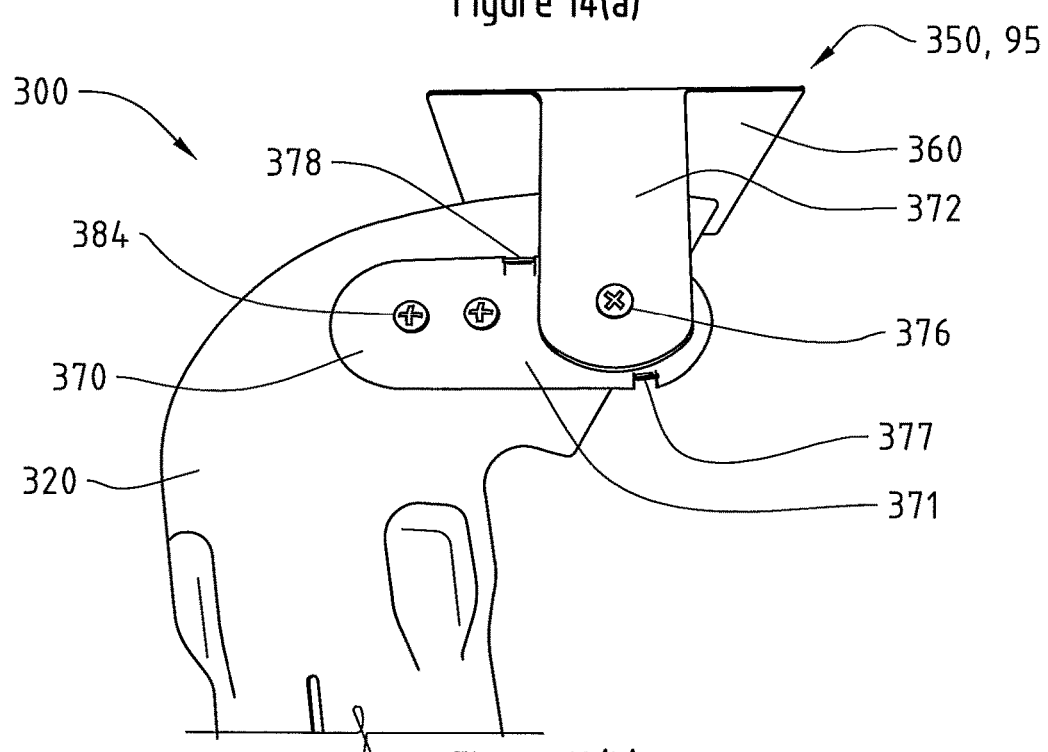
FIG. 14(b) shows a different side perspective view of the device shown in FIG. 14(a) fitted to a snorkel head.

Referring now to FIGS. 14(a) and 14(b), there is shown a device (350, 95) fitted to a snorkel head (320, 300). When in use, two arms (370) extend rearwardly from the shield/front face (360). Each arm (370) comprises a first portion (371) and a second portion (372), wherein the first portion (371) of each arm is formed as a unitary piece or a base comprising one or more openings (with two openings being shown in FIGS. 14a and 14b) for securing the first portion (371) of the arm to the snorkel head (320) by way of screw fasteners (384). The first portion (371) of at least one of the aims (370) comprises an upper travel stop/welded protrusion (378) for holding the shield/front face (360) in its clear position, and a lower travel stop/welded protrusion (377) for holding the shield/front face (360) in its in-use position. The second portion (372) of each aim (370) and the shield/front face (360) of the device (350/95) are formed as a unitary piece. The second portion (372) of each arm (370) and the shield/front face (360) are pivotally mounted to the snorkel head (320) about a pivot point (376) by way of any suitable means (with a screw fastener being shown in FIGS. 14a and 14b), so as to allow the shield/front face (360) to move between an in-use position and a clear position. In use, after the device (350, 95) has been secured to the snorkel head (320), there is a clearance, space or void between the shield (360) of the device (350, 95) and the inlet of the snorkel air intake.

ADVANTAGES OF THE INVENTION

In various embodiments, the present invention provides one or more of the advantages listed below:
limits the air ram effect caused by a forward facing snorkel head orientation in relation to vehicle speed; provides a buffering effect to stabilise air flow into the engine, allowing stable metering of air entering the engine regardless of speed;
limits the intake of rain/water into the engine's air intake system; reduces the chances of having soaked or partially saturated air filters with inferior air flow characteristics resulting in a longer air filter life;
allows all the benefits of a snorkel (e.g. elevated air intake allowing for cooler air with more energy resulting in better fuel consumption, less dust and further away from water during river crossings), with the benefits of an original engine's air pickup, wherein the air pick up is in the inner guard (e.g. where the air pressure is more stable into the engine);
the device is non-vehicle specific; suits any type of vehicle with a snorkel, such as petrol, petrol/LPG and diesel engines, including vehicles with turbo and supercharged engines;
the device suits traditional snorkel head designs, and can be easily retro-fitted to these designs, including rectangular snorkel heads based on, and including the Safari snorkel design;
the device fits snorkel head designs with different head angles, ranging from vertical to forward facing;
the device is small and may be easily transported (e.g. in the car);
the device may be cheaply and easily manufactured, for example from a rust-proof material with a long lasting finish that is suitable for outdoor use;
the device is of an interchangeable design; evenly spaced mounting holes allow for the device to be adapted and used with different snorkel designs, and for the shield to be positioned at different distances from the air inlet depending on driving conditions (e.g. increasing rain fall or sudden sand storms);
no documented change in fuel consumption; testing performed by the inventor with and without the device (open and closed configuration) at highway speeds with constant throttle opening resulted in no speed change regardless of the position of the device; and
the device allows a forward facing snorkel head/air ram head when a duel fuel (e.g. petrol and LPG) vehicle is running on LPG with no modifications to the air filter housing and/or air filter ducting; the device limits the vastly differing positive air pressures in the air inlet system of the engine therefore resulting in a stable air flow with a forward facing snorkel head. The usual multiple large (about 50 mm each) air pressure dump holes (drilled during the LPG installation) are no longer required in between the snorkel head and air filter, therefore resulting in no hot air from the engine bay entering the air intake system; there is no chance of water/flood water entering the air intake system (as the multiple large air pressure dump holes are not needed), therefore the air intake system is sealed to manufacturer specifications.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A device for fitting to a vehicular snorkel air intake in which the snorkel air intake faces toward a forward direction of travel of the vehicle, said device comprising a shield and at least one arm extending from the shield, wherein the at least one arm is adapted to position the shield in front of an inlet of the snorkel air intake, wherein the shield is sized to a dimension that is at least as large as an inlet to the snorkel air intake and that in an in-use position the shield is spaced from and positioned directly in front of the snorkel air intake such that, when viewed from front on, the shield hides the snorkel air intake, wherein the device at least partly reduces the air ramming effect experienced by the snorkel and stabilises air flow into the snorkel air intake.

2. A kit comprising the device of claim 1 and mounting means for mounting the device to a vehicular snorkel air intake.

3. The device of claim 1 when used with a vehicular snorkel air intake.

4. The device of claim 1, wherein the snorkel air intake is a portion of snorkel or a complete snorkel.

5. The device of claim 1, wherein the snorkel air intake is a snorkel head.

6. The device of claim 1, wherein the device comprises two arms.

7. The device of claim 1, wherein the device deflects rain and at least partly reduces water intake into the snorkel air intake.

8. The device of claim 1, wherein the device is made from a material selected from the group consisting of metal, plastics, fiberglass, and carbon fibre.

9. The device of claim 1, wherein the device is made from stainless steel.

10. The device of claim 1, wherein the shield is positioned about 5 to about 700 mm in front of the inlet of the snorkel air intake.

11. The device of claim 1, wherein the shield is positioned about 20 mm to about 600 mm in front of the inlet of the snorkel air intake.

12. The device of claim 1, wherein the shield is positioned about 30 mm to about 300 mm in front of the inlet of the snorkel air intake.

13. The device of claim 1, wherein the shield is pivotally mounted, or adapted to be pivotally mounted, to the vehicular snorkel air intake.

14. A forward facing vehicular snorkel air intake, the snorkel air intake having a shield positioned, or adapted to be positioned, in front of an inlet of the snorkel air intake, wherein the shield is sized to a dimension that is at least as large as an inlet to the snorkel air intake and that in an in-use position the shield is spaced from and positioned directly in front of the snorkel air intake such that, when viewed from front on, the shield hides the snorkel air intake, wherein the shield at least partly reduces the air ramming effect experienced by the snorkel and stabilises air flow into the snorkel air intake.

15. A method of fitting a device to a vehicular snorkel air intake, said device comprising a shield and at least one arm, wherein the shield is sized to a dimension that is at least as large as an inlet to the snorkel air intake, wherein the method comprises the step of (i) mounting the at least one arm to a vehicular snorkel air intake, such that in an in-use position the shield is spaced from and positioned directly in front of the snorkel air intake such that, when viewed from front on, the shield hides the snorkel air intake, wherein the device at least partly reduces the air ramming effect experienced by the snorkel and stabilises air flow into the snorkel air intake.

16. The method of claim 15, wherein the at least one arm is adapted to mount the device to the snorkel air intake, wherein the shield is sized to a dimension that is at least as large as an inlet to the snorkel air intake and that in an in-use position the shield is spaced from and positioned directly in front of the snorkel air intake such that, when viewed from front on, the shield hides the snorkel air intake.

17. A device for fitting to a vehicular snorkel, the device comprising a shield for positioning at least partially in front of a forward facing inlet of an air intake of the snorkel, and mounting means for mounting the device to the snorkel, wherein the shield is sized to a dimension that is at least as large as an inlet to the snorkel air intake and that in an in-use position the shield is spaced from and positioned directly in front of the snorkel air intake such that, when viewed from front on, the shield hides the snorkel air intake, wherein the device at least partly reduces the air ramming effect experienced by the snorkel and stabilises air flow into the snorkel air intake.

18. An end portion of a vehicular snorkel air intake, the end portion comprising a forward facing closed end and a body portion extending from the closed end, wherein the body portion comprises one or more openings to enable air to flow through the one or more openings and into the snorkel, wherein the closed end is sized to a dimension that is at least as large as an inlet to the snorkel air intake and that in an in-use position the closed end is spaced from and positioned directly in front of the snorkel air intake such that, when viewed from front on, the closed end hides the snorkel air intake, wherein the device at least partly reduces the air ramming, effect experienced by the snorkel and stabilises air flow into the snorkel air intake.

* * * * *

UNITED STATES PATENT AND TRADEMARK OFFICE
CERTIFICATE OF CORRECTION

PATENT NO. : 10,060,395 B2
APPLICATION NO. : 15/069171
DATED : August 28, 2018
INVENTOR(S) : Kenneth Somerville It is certified that error appears in the above-identified patent and that said Letters Patent is hereby corrected as shown below:

In the Specification

Column 8, Line 46, delete "aim" and substitute therefore --arm--.

Column 10, Line 3, delete "aims" and substitute therefore --arms--.

Column 10, Line 7, delete "aim" and substitute therefore --arm--.

Signed and Sealed this
Twenty-sixth Day of March, 2019

Andrei Iancu
*Director of the United States Patent and Trademark Office*